United States Patent Office 2,766,224
Patented Oct. 9, 1956

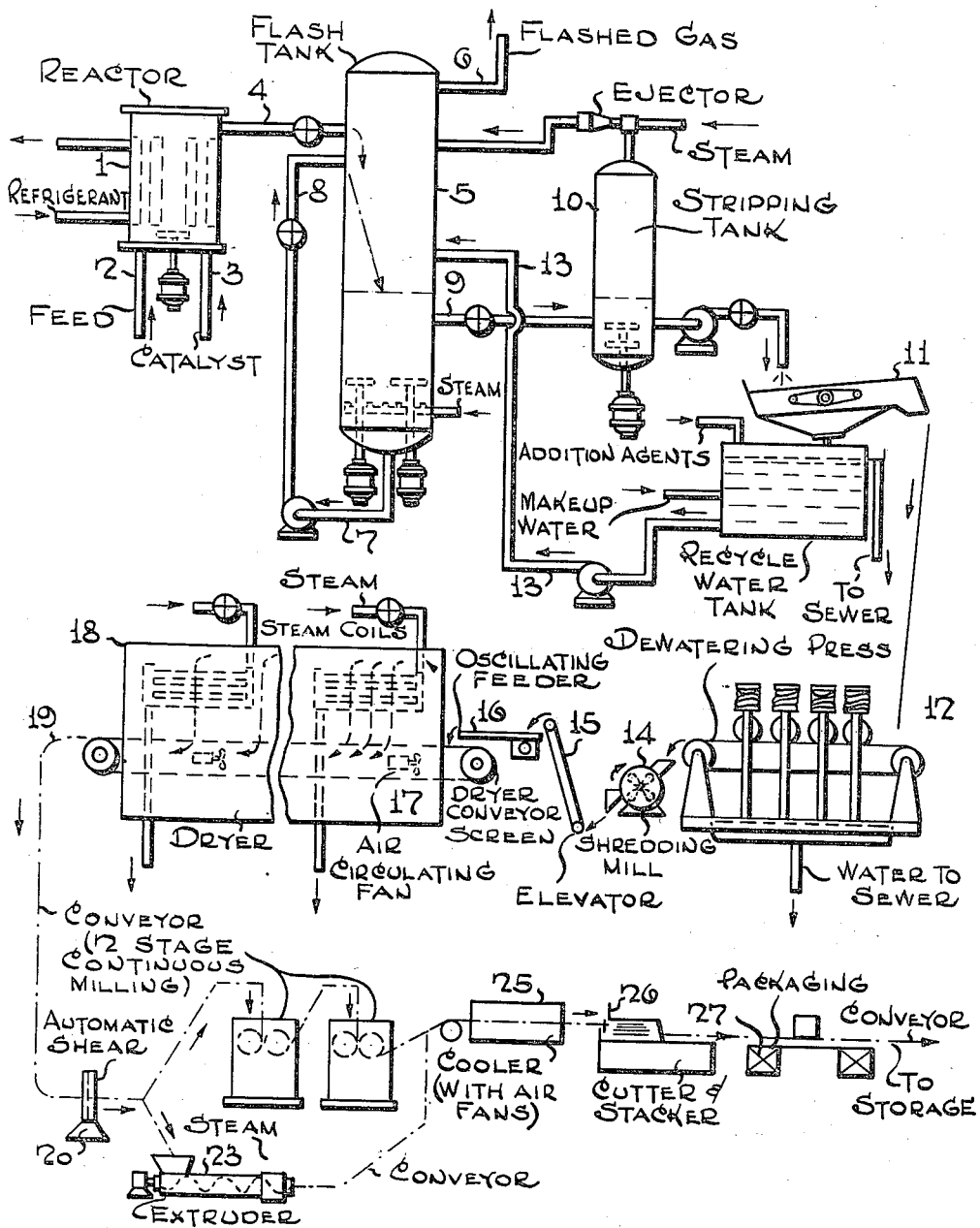

2,766,224

SURFACE COATINGS FOR POLYMER DRYERS

John H. Bannon, Cranford, N. J., assignor to Esso Research and Engineering Company, a corporation of Delaware Application November 18, 1952, Serial No. 321,180

6 Claims. (Cl. 260—88.1)

This invention relates to polymerization processes and apparatus and particularly to processes and apparatus for the low temperature polymerization of iso-olefins or mixtures of iso-olefins and aryl olefins.

It has been known for some time that high molecular weight polymers, i. e., having a molecular weight of from about 15,000–25,000 up to 300,000 or more (as determined by the Staudinger method) are obtained if iso-olefins, such as iso-butylene, are contacted with Friedel-Crafts type catalyst such as aluminum chloride and the like at temperatures below about 0° F. (See, for example, Mueller-Cunradi U. S. Patent No. 2,203,873, issued June 11, 1940.) It is well known that isobutylene can be polymerized at low temperatures below 0° F. either alone or together with co-reactants such as diolefins, such as butadiene or isoprene, or aromatic olefins, such as styrene or its ring substituted alkyl homologs. In the preparation of all of these polymers the polymer, either as a solution or as a slurry in the reaction liquor, is treated with hot water or steam to remove volatile constituents such as reaction diluents, unreacted monomers and the like. This technique introduces water into the product which must be removed. In order to accomplish this it is customary to pass the polymer after filtering from excess water if necessary, through a drying oven at a temperature of about 200°–350° F. In order to prevent the polymer from sticking to the dryer surfaces it has been found necessary to coat the conveyor surfaces with an anti-sticking agent in order to alleviate the problem of the polymer sticking to the dryer surfaces. Materials which have been suggested for this purpose include zinc stearate, zinc oxide, aqueous soap solutions, sodium stearate, aluminum stearate, talc, clay, vegetable oils, such as castor oil and the like.

While the present invention is applicable for use with any of the above mentioned polymers or co-polymers it has particular application in connection with the co-polymer of isobutylene and styrene. This is a high quality resin and should have a very light color, be as clear and free from contamination as possible and be sufficiently pure to permit its use for food packaging. This introduces special problems with regard to the anti-tack agent which can be used on the surfaces of the drying equipment. Many of the above listed anti-tack agents are unsuitable for use with any of the polymers but others which can be used with those polymers which do not have to be clear cannot be used with the styrene-isobutylene co-polymers.

Zinc stearate fuses at temperatures substantially above 220° F. and when the dryer temperature is kept low enough to prevent fusion, the polymer is often inadequately dried. Above its melting point, however, zinc stearate loses much of its anti-sticking effect against iso-olefinic polymers. Furthermore, if the polymer is to be used in food packaging, as is the case with the co-polymers and isobutylene and styrene, the zinc stearate is too toxic to be used. The use of dry talc or clays is not usually satisfactory because the dry pigments are not sufficiently adherent to the dry screen to be serviceable under the conditions of use. If wetted or applied as a slurry, pigments such as zinc oxide, talc and clays form coatings which either become powdery and flaky upon drying with the result that such coatings are largely removed from the screen upon contact with the polymers or which web over and plug the perforations or screen openings in the conveyor, thus interfering with the circulation of air through the bed of polymer.

Castor oil and similar vegetable oils have been found satisfactory for use with the co-polymer of isobutylene and isoprene but in the case of resins such as the co-polymer of isobutylene and styrene the discoloration suffered by the castor oil or other vegetable oil degrades the color and clarity of the resin to an intolerable degree.

Sodium stearate has been found unsatisfactory when drying the low molecular weight polymers and aluminum stearate, which must be used as a slurry in water, is difficult to apply even when the slurry is stabilized with alcohol. Furthermore, the slurry must be brushed on by hand which is expensive.

Clays and oxides are additionally disadvantageous with respect to the isobutylene-styrene co-polymer because these materials are insoluble in the resin and tend to give it a cloudy appearance.

It is, therefore, the main object of this invention to provide a method of removing volatile impurities from polymers which will permit more efficient operation of process and prevent sticking of the polymers to the heated surfaces of the apparatus.

It is a further object of this invention to provide a coating for the surfaces of the drying equipment which will not discolor the polymer, render it cloudy or opaque or contaminate it so that it cannot be used for such purposes as packaging foods.

These and other objects of this invention are accomplished by passing the polymer through a heating zone, the polymer contacting surfaces of which are coated with a mixture of sodium soap and aluminum stearate.

The invention finds its principal application in the drying of high quality resins such as the co-polymer of isobutylene and styrene described in U. S. Patent 2,274,749 to W. H. Smyers issued March 3, 1942.

Instead of isobutylene, other aliphatic mono-olefins may be used preferably having more than 2 carbon atoms and preferably iso-olefins having 4 to 8 carbon atoms, such as isopentene (methyl-2 butene-1) or a pentene obtained by dehydration of secondary amyl alcohol.

Instead of styrene, other polymerizable, mono-olefinic aromatic hydrocarbons may be used, such as indene, the homologues of styrene, e. g. alphamethyl styrene, paramethyl styrene, alphamethyl paramethyl styrene or dihydro naphthalene.

The co-polymerization is effected by mixing the two reactants, with or without a mutual solvent, if necessary, such as ethylene, propane, butane, methyl chloride or refined naptha, and then after the cooling of the reactants to the desired low temperature below 0° F., adding a Friedel-Crafts halide catalyst such as boron fluoride or boron fluoride catalyst activated by the addition of 0.1% of diethyl ether, aluminum chloride, titanium tetrachloride or aluminum alkoxide-aluminum chloride complex $(AlCl_3 \cdot Al(OC_2H_5)_3)$. If desired, such catalyst may be dissolved in a solvent such as carbon disulfide, a low molecular weight sulfur-free saturated hydrocarbon, a lower alkyl halide, e. g. methyl chloride, or ethyl chloride or a mixture of methyl chloride with butane at or below the boiling point of the catalyst solvent, and then the catalyst solution cooled down, filtered and added to the reaction mixture. Alternative catalysts include:

$$Al_2Cl_6.2(ClCH_2CH_2)_2O$$
$$TiCl_4.C_6H_5OCH_3$$
$$AlCl_3.AlCl_2OH$$
$$AlBr_3.AlBr_2OH$$
$$AlBr_2Cl.AlOCl$$
$$AlBrCl_2.AlOBr$$
$$TiCl_4.AlCl_2OH$$
$$TiOCl_2.TiCl_4$$
$$AlBr_3.Br_2.CS_2$$

$BF_3$ solution in ethylene, activated $BF_3$ catalyst in methyl chloride solution. Volatile solvents or diluents, e. g. propane, ethane, ethylene, methyl chloride, alkyl halides, methylene chloride or carbon dioxide (liquid or solid) may also serve as internal or external refrigerants to carry off the liberated heat of polymerization. After completion of the co-polymerization, residual catalyst is hydrolysed with alcohol, for example, isopropyl, and excess catalyst removed by washing the product with water and preferably also with dilute aqueous caustic soda. The resulting solid copolymer may range from a viscous fluid or a relatively stiff plastic mass to a hard, tough thermoplastic resinous solid, depending upon the temperature of polymerization, the yield of polymer obtained upon the active feed, the type and concentration of catalyst, the proportion of cyclic reactant in the feed, and the temperature at which the physical texture is observed.

When copolymers are prepared according to this invention, i. e. with a combined styrene content of 5 to 90%, using co-polymerization temperatures below $-50°$ F., the resultant copolymers will generally have average molecular weights above 6,000, and preferably 10,000 to 150,000, with intrinsic viscosities above 0.8 and preferably above 1.30. The higher molecular weight and intrinsic viscosities are obtained with the lowest co-polymerization temperatures, and they are also favored by the lower content of cyclic reactant, i. e. a percent of combined styrene of 20 to 60 T. The hardness of the copolymer generally increases with increasing content of combined styrene or other cyclic constituents.

Thus the preferred operating conditions for making the copolymers for use according to this invention comprise copolymerizing a reaction mixture containing 20-60% of styrene and balance isobutylene, at a temperature below $-70°$ F. in the presence of about 1-4 volumes of methyl chloride or other lower alkyl halides per volume of active polymerization feed, and using as the catalyst the solution of aluminum chloride dissolved in methyl chloride or other lower alkyl halides.

The polymer dissolves in the cold reaction diluent and is discharged into a well-agitated body of a heated liquid medium, such as water, in which the polymer is insoluble and which is maintained at a temperature well above the boiling point of the volatile materials accompanying the polymer, the form a slurry of finely divided polymer particles in the water and to flash off the reaction mixture. This slurry is then stripped of any residual volatile materials and dried while being carried through a tunnel on a screen or on sections of a perforated plate in the presence of warm air.

In order to make the invention more clearly understood, there is shown in the accompanying drawing one means for carrying the same into practical effect.

Referring, therefore, to the drawing, there is shown a reactor 1 wherein isobutylene and styrene and alone or together with a diluent supplied through feed inlet 2 are reacted at low temperatures, preferably around $-140°$ F., by the addition of a Friedel-Crafts catalyst supplied through line 3. The polymer, formed as a solution in cold reaction medium comprising unreacted hydrocarbons, diluents, catalyst and catalyst solvent as well as impurities, is withdrawn from the reactor through line 4 and is discharged into flash tank 5 containing a liquid, such as water, inert to the polymer and maintained at a temperature of approximately 150° F. wherein the volatile materials associated with the polymer are flashed into vapor. The flashed gases are withdrawn from the flash tank through line 6 and are passed to suitable purification and recovery means for reconditioning the flashed materials for reuse in the process.

The water or other liquid medium is heated, as by the introduction of steam thereinto, and vigorously agitated by means of suitable stirrers or the like to keep the polymer suspended as a uniform slurry in the liquid. Liquid may also be withdrawn from the flash tank through line 7 and pumped back into the flash tank as at 8 in such a manner as to impinge against the polymer stream entering the flash tank thereby breaking it up in order to prevent agglomeration of the polymer into relatively large masses which might plug the water slurry system and which might contain excessive amounts of trapped volatile liquid.

The polymer is withdrawn from the flash tank through line 9 as a slurry of finely divided solid particles suspended in the warm liquid and is discharged into the stripping tank 10. The treatment of the polymer as a slurry in the warm fluid, if necessary with injection of stripping vapors such as steam, is carried out to such a degree that nearly all the highly volatile materials originally absorbed in or absorbed on the polymer and dissolved in the liquid are removed. A preferred type of operation is one in which the volatiles are removed in two zones, the first as in flash tank 5 at atmospheric or slightly above atmospheric pressure and the other as in stripping tank 10 at below atmospheric pressure. Preferably, the water in the stripper 10 is boiling, due to use of vacuum. The flow of water is usually so large that steam does not have to be added to the stripper when the water enters hot enough.

The slurry of finely divided polymer in warm liquid, desirably water, is passed from the stripping tank 10 onto a vibrating screen 11 or other means for separating the bulk of the suspending liquid, such as a rotary vacuum filter. After being separated from the greater part of the suspending liquid, it is discharged into a dewatering press 12 of the endless screen type wherein it is passed between pressure rollers which squeeze out further amounts of water or suspending liquid. The water or the like passing through the vibrating screen is desirably collected, make-up liquid and any desired addition agents, such as alkalies for reducing acidity caused by decomposition of the catalyst, zinc stearate, dispersing agents, etc. are added, whereupon the liquid is recycled to the flash tank through line 13. The liquid removed in the press 12 may be discharged to the sewer or recovered in suitable fashion.

The polymer is then discharged into a suitable disintegrating means such as a hammer mill 14 in order to reduce the size of the polymer particles preparatory to discharge into the dryer system. The polymer particles discharged from the hammer mill are conveyed by suitable means such as an elevator 15 to an oscillating feeder 16 which serves to distribute the polymer on the conveyor screen 17 passing through the dryer 18.

According to the invention, polymer from which the major quantity of liquid has been removed by pressing, etc., is treated in the dryer under conditions to remove the residual adhering or occluded fluid, usually water, as well as traces of impurities or by-products of relatively low volatility carried through with the polymer from the reaction zone. Removal of substantially all of the water and volatile impurities is essential since appreciable amounts thereof usually interfere with proper processing of the polymers or tend to make the polymer cloudy.

The dryer used may be a continuous conveyor dryer, the polymer being carried through a tunnel on a screen or on sections of perforated plate, although other types of dryers may be used. The dryer is preferably of a tunnel, continuous conveyor, through-flow type of either one or more passes, wherein a considerable flow of air or other inert gas is recirculated over steam coils or other heating elements and through or against the bed of polymer material slowly moving through the dryer on a perforated conveyor belt or screen. The preferred drying temperature is usually between 200° F. and 350° F. and is dependent upon the molecular weight of the polymer being handled and the time of exposure to said drying temperature. It is desirable, where possible, to avoid softening the polymer in the dryer by too long exposure to high temperatures so as to permit better circulation of air through the bed. However, with some products, softening takes place quite readily and in these cases the avoidance of softening would limit temperatures to a degree which gives very slow drying rates. In such cases, it is usually more effective to accept the softening and the consequent low air rate through the bed and to operate at considerably higher temperatures, limited by the tendency of the polymer to adhere to the perforated plates or by the danger of deteriorating the product quality. For rapid conveyor speeds, i. e., short residence times in the dryer, higher drying temperatures can be used than for slow conveyor speeds.

As pointed out above, it has been attempted to overcome this problem of sticking by coating the conveyor surfaces with a suitable anti-sticking agent but none of the prior materials have been sufficiently satisfactory when it is desired to obtain a clear high grade resin. It has now been found, however, that it is very advantageous to coat such surfaces with a mixture of sodium soaps and aluminum stearate. Suitable sodium soaps include sodium oleate, sodium stearate, sodium palmitate or a mixture of two or more of these soaps. A particularly satisfactory mixture comprises 20 lbs. of sodium stearate and 150 lbs. of aluminum stearate mixed with 100 gallons of water.

The soap is applied to the desired surfaces of the apparatus by brushing, spraying or by other known means. This may be accomplished by brushing, spraying or by other known means. This may be accomplished either manually or automatically, for example, by means of applicators having a brushing, wiping or rolling action or by suitable spray nozzles. In the case of continuous operation, as for example using tunnel type dryers, a preferred method is to spray the soap onto the surface of the conveyor during its "return pass" for example just ahead of the polymer-loading point, using automatically operated spray nozzles whose motion or delivery is synchronized with the travel of the conveyor. The quantity required is relatively small and is, of course, dependent upon the type of soap chosen, type of polymer being handled, temperature of operation and other operating variables. It has been found possible to obtain satisfactory operation in plant scale tests when using no more than 2 pounds of soap per 100 pounds of polymer handled, and under favorable conditions, a soap consumption of about 1 pound per 100 pounds of polymer or even less can be used. The ratio of sodium soap to aluminum stearate may vary from 1 part by weight per 100 parts of aluminum stearate to equal parts of each soap.

The polymer leaving the dryer or heating zone can be cooled directly for packaging or use, or it can be further processed as by extrusion compressing, kneading, milling or sheeting in order to homogenize or compact the polymer, reduce its porosity, or assist the escape of entrapped moisture or other vapors which may have been formed or liberated within the polymer particles during the heating step.

While one specific process embodying the novel steps of the present invention, as well as one specific apparatus for carrying out the same has been described in considerable detail, it is to be understood that this description is illustrative only, and for the purpose of making the invention more clear, and it is not intended that the invention shall be construed as limited to details of the description except insofar as such limitations have been included in the terms of the following claims in which it is the intention to claim all novelty inherent in the process according to the present invention. For example, the present invention, while particularly applicable to polymers formed by low temperature processes, may also be used in connection with the processing of polymers formed under high temperatures, such as copolymers of diolefins with styrene or acrylonitrile.

The nature and objects of the present invention having been thus described and illustrated, what is claimed as new and useful and is desired to be secured by Letters Patent is:

1. The process of treating solid high molecular weight rubbery polymer prepared from iso-olefins at temperatures below about 0° F. in the presence of a Friedel-Crafts type catalyst which comprises passing the polymer through a zone heated to a temperature between 200 and 350° F., the polymer-contacting surfaces of which are coated with a layer in which the anti-sticking agents consist of a mixture of a sodium soap and aluminum stearate.

2. A method of treating rubbery polymers which comprises heating the polymer to a temperature between 200 and 350° F. in a zone, the polymer-contacting surfaces of which are coated with a layer in which the anti-sticking agents consist of a mixture of a sodium soap and aluminum stearate.

3. A method of drying rubbery polymers which comprises continuously conveying the polymer through a drying zone heated to a temperature between 200 and 350° F., the conveyor surfaces of which are coated with a layer in which the anti-sticking agents consist of a mixture of sodium and aluminum stearates.

4. An improved process for drying a Friedel-Crafts polymer containing iso-olefins which comprises passing said polymer through a zone having polymer contacting surfaces coated with a layer in which the anti-sticking agents consist of an admixture of a sodium soap and aluminum stearate and drying the polymer at a temperature between about 200°–350° F.

5. Process according to claim 4 in which the polymer is the reaction product of an iso-olefin and a vinyl aromatic hydrocarbon, and the sodium soap is selected from the group consisting of oleates, palmitates and stearates.

6. Process according to claim 5 in which the polymer contains the reaction product of isobutylene and styrene and the sodium soap is sodium stearate.

References Cited in the file of this patent

UNITED STATES PATENTS

| | | |
|---|---|---|
| 2,127,497 | Webster | Aug. 23, 1938 |
| 2,401,754 | Green | June 11, 1946 |
| 2,419,713 | Flood | Apr. 29, 1947 |
| 2,478,718 | Singleton | Aug. 9, 1949 |
| 2,532,985 | Bannon | Dec. 3, 1950 |
| 2,611,751 | Scott | Sept. 23, 1952 |
| 2,619,461 | Ford | Nov. 25, 1952 |
| 2,626,896 | Dilworth | Jan. 27, 1953 |